United States Patent Office 3,798,155
Patented Mar. 19, 1974

3,798,155
HYDROCARBON CONVERSION PROCESS AND BIMETALLIC CATALYTIC COMPOSITE FOR USE THEREIN
Frederick C. Wilhelm, Arlington Heights, Ill., assignor to Universal Oil Products Company, Des Plaines, Ill.
No Drawing. Filed Mar. 10, 1972, Ser. No. 233,819
Int. Cl. C10g *35/06*
U.S. Cl. 208—139      8 Claims

ABSTRACT OF THE DISCLOSURE

A catalytic composite comprising a combination of a platinum group component, a bismuth component and a halogen component with a porous carrier material is disclosed. The platinum group metal and halogen components are present in the composite in amounts, calculated on an elemental basis, corresponding to about 0.01 to about 2 wt. percent platinum group metal and about 0.1 to about 3.5 wt. percent halogen. The bismuth component is present in an amount corresponding to an atomic ratio of bismuth to platinum group metal of about 0.1:1 to about 1:1. Moreover, both the platinum group component and the bismuth component are uniformly dispersed throughout the porous carrier material and both of these metallic components are present in the elemental metal state. The principal utility of the subject composite is in the conversion of hydrocarbons, particularly in the reforming of a gasoline fraction. A specic example of the catalyst disclosed is a combination of a platinum component, a bismuth component, and a halogen component with an alumina carrier material, wherein the platinum and bismuth components are uniformly dispersed throughout the carrier material, wherein the composite contains 0.01 to 2 wt. percent platinum, 0.1 to 3.5 wt. percent halogen, and an amount of bismuth corresponding to an atomic ratio of bismuth to platinum of 0.1:1 to 1:1 and wherein both the platinum and bismuth components are present as the corresponding elemental metals.

---

The subject of the present invention is a novel catalytic composite which has exceptional activity, selectivity, and resistance to deactivation when employed in a hydrocarbon conversion process that requires a catalyst having both a hydrogenation-dehydrogenation function and an acid function. More precisely, the present invention involves a novel dual-function catalytic composite which utilizes a catalytic component, bismuth, which traditionally has been thought of and taught to be a poison for a platinum group metal because of its close proximity in the Periodic Table to the notorious platinum poison, arsenic. Bismuth is utilized in the present invention to interact with a platinum group metal-containing catalyst to enable substantial improvements in hydrocarbon conversion processes of the type that have traditionally utilized platinum group metal-containing catalysts to accelerate the various hydrocarbon conversion reactions associated therewith. In another aspect this invention concerns the improved processes that are produced by the use of a catalytic composite comprising a combination of a platinum group component, a bismuth component, and a halogen component with a porous, high surface area carrier material in a manner such that (1) the platinum group and bismuth components are uniformly dispersed throughout the porous carrier material, (2) the amount of the bismuth component is not greater than the amount of the platinum group component on an atomic basis, and (3) the platinum group and bismuth components are present as the corresponding metals. In a specific aspect the present invention concerns a improved reforming process which utilizes the subject bimetallic catalyst to markedly improve activity, selectivity, and stability characteristics associated therewith, to increase yields of $C_5+$ reformate and of hydrogen recovered therefrom and to allow operation thereof at high severity conditions not heretofore generally employed in the art of continuous catalytic reforming of hydrocarbons with a platinum-containing, monometallic, dual-function catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous adsorptive, refractory oxide type which is typically utilized as the support or carrier for a heavy metallic component such as the metals or compounds of metals of the transition elements of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commerical applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin and/or olefinic compounds are contacted with a dual-function catalyst to produce an output stream rich in iso-paraffin compounds.

Regardless of the reaction involved or the particular process involved, it is of critical importance that the dual-function catalyst exhibit not only the capability to initially perform its specified functions but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity usually refers to the amount of $C_5+$ yield that is obtained at the particular severity level relative to the amount of the charge stock; and stability is typically equated to the rate of change with time of activity, as measured by octane number of $C_5+$ product and of selectivity, as measured by $C_5+$ yield. Actually, the last statement is not strictly correct because generally a continuous reforming process is run to product a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5+$ yield-octane relationship—$C_5+$ yield being representative of selectivity and octane being proportional to activity.

I have now found a dual-function catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I have ascertained that a catalytic composite comprising a combination of a platinum group component, a bismuth component and a halogen component with a porous refractory carrier material can enable the performance of a hydrocarbon conversion process utilizing a dual-function catalyst to be substantially improved, provided the amounts and oxidation state of the metallic components and the distribution thereof in the catalytic composite are carefully controlled in the manner indicated herein. Since the earliest introduction of catalysts containing a platinum group component, it has been axiomatic that the effect of arsenic on a platinum-containing catalyst is detrimental. This concept has become so fixed and certain in the art that tremendous efforts have been devoted to removing arsenic contaminants from charge stocks that are to be processed in a unit containing a platinum catalyst. In addition, the art is replete with a significant number of methods for reactivating a platinum-containing catalyst once it has been deactivated by contact with arsenic or compounds of arsenic. Because bismuth is a member of the same group of the Periodic Table (Group V-A) and is known to have similar chemical properties to arsenic, it has fallen into the same category and has been traditionally thought of as a poison from a platinum-containing catalyst. The art has on occassion hinted at or proposed to use the poisoning effect of Group V-A metallic elements to modify or attenuate the platinum component of a dual function catalyst. For examples of these suggestions, reference may be had to the teachings of U.S. Pats. Nos. 3,156,737; 3,206,391; 3,291,755 and 3,511,888. However, the art has not recognized that bismuth can be utilized to promote a platinum-containing catalyst; that is, to simultaneously increase its activity, selectivity and stability in hydrocarbon conversion service. In particular, the art has apparently never contemplated the use of a platinum-bismuth catalyst in a catalytic reforming process. As a matter of fact the art on this last process is replete with teachings that contact of the platinum-containing reforming catalyst with metallic elements of Group V-A of the Periodic Table, and particularly arsenic, is to be avoided if at all possible and if contact occurs to any substantial degree the catalyst must be immediately regenerated or reactivated by procedures for removal of these detrimental Group V-A constituents. In sharp contrast to this historic teaching of the art that bismuth is detrimental to a platinum-containing catalyst, I have now discerned that the presence of bismuth in a platinum group component-containing composite can be very beneficial under certain conditions. One essential condition associated with the acquisition of the beneficial interaction of bismuth with the platinum-containing catalyst is the atomic ratio of bismuth to platinum group metal contained in the composite; my findings here indicate that it is only when this ratio is not greater than 1:1 that the beneficial interaction of bismuth with the platinum group metal is obtained. A second condition is the presence of a halogen component; my finding on this matter is that presence of a relatively small amount of halogen is required to see the beneficial effect. Another condition for achieving this beneficial interaction of bismuth with the platinum catalyst is the distribution of both the bismuth and platinum group components in the carrier material with which they are combined; my finding here is that it is essential that both of these components be uniformly dispersed throughout the porous carrier material. Still another condition for this beneficial effect is the oxidation state of the bismuth and platinum group components; my finding here is that it is essential that they both be present in the composite in the elemental metal state. A catalyst meeting these essential limitations differs sharply both in substance and in capabilities from the bismuth- and platinum-containing catalysts that are suggested by the prior art as will be demonstrated in subsequent examples.

In the case of a reforming process, one of the principal advantages associated with the use of the instant bimetallic catalyst involves the acquisition of the capability to operate in a stable manner in a high severity operation; for example, a continuous reforming process producing a $C_5+$ reformate having an octane of about 100 F-1 clear and utilizing a relatively low pressure of 50 to about 350 p.s.i.g. In this latter embodiment the principal effect of the bismuth component is to stabilize the platinum group component by providing a mechanism for allowing it to better resist the rather severe deactivation normally associated with these conditions. In short, the present invention essentially involves the finding that the addition of a controlled amount of a bismuth component to a dual-function hydrocarbon conversion catalyst, containing a platinum group component and a halogen component, coupled with the uniform distribution of the bismuth component throughout the catalytic composite to achieve an atomic ratio of bismuth to platinum of not greater than 1:1 and with careful control of the oxidation states of the metallic components enables the performance characteristics of the catalyst to be sharply and materially improved.

It is, accordingly, one object of the present invention to provide a bimetallic hydrocarbon conversion catalyst having superior performance characteristics when utilized in a hydrocarbon conversion process. A second object is to provide a bimetallic catalyst having dual-function hydrocarbon conversion performance characteristics that are relatively insensitive to the deposition of hydrocarbonaceous material thereon. A third object is to provide preferred methods of preparation of this bimetallic catalytic composite which insures the achievement and maintenance of its beneficial properties. Another object is to provide an improved reforming catalyst having superior activity, selectivity, and stability when employed in a low pressure reforming process. Yet another object is to provide a dual-function hydrocarbon conversion catalyst which utilizes a relatively inexpensive component, bismuth, to promote and stabilize a platinum group metal component. Still another object is to provide a method of preparation of a bismuth-platinum catalyst which insures the bismuth component is in a highly dispersed state during use in the conversion of hydrocarbons.

In one embodiment, the present invention is a catalytic composite comprising a combination of a platinum group component, a bismuth component and a halogen component with a porous carrier material. The platinum group and halogen components are present in this composite in an amount sufficient to result in the composite containing, on an elemental basis, about 0.01 to about 2 wt. percent of the platinum group metal and about 0.1 to 3.5 wt. percent halogen. Likewise, the bismuth component is present in an amount corresponding to an atomic ratio of bismuth to platinum group metal of about 0.1:1 to about 1:1. Furthermore, both the bismuth and platinum group components are uniformly distributed throughout the porous carrier material and are present as the corresponding elemental metals.

A second embodiment involves a catalytic composite comprising a platinum group component, a bismuth component, and a halogen component with a carrier material consisting essentially of alumina. The components are present in amounts sufficient to result in the composite containing, on an elemental basis, about 0.01 to about 2 wt. percent of the platinum group metal, about 0.1 to about 3.5 wt. percent halogen, and bismuth in an amount corresponding to an atomic ratio of bismuth to platinum group metal of about 0.1:1 to about 1:1. Moreover, the platinum group component and the bismuth component are uniformly distributed throughout the alumina carrier material and are present as the corresponding elemental metals.

A third embodiment relates to a catalytic composite comprising a combination of the catalytic composite delineated above in the first embodiment with a sulfur component in an amount sufficient to incorporate about 0.05 to about 0.5 wt. percent sulfur, calculated on an elemental surfur basis.

Another embodiment relates to a process for the conversion of a hydrocarbon which comprises contacting the hydrocarbon with the catalytic composite described above in the first embodiment at hydrocarbon conversion conditions.

A preferred embodiment relates to a process for reforming a gasoline fraction which comprises contacting the gasoline fraction and hydrogen with the catalytic composite described above in the first embodiment at reforming conditions selected to produce a high octane reformate.

Other objects and embodiments of the present invention relate to additional details regarding preferred catalytic ingredients, amounts of components in the catalyst composite, suitable methods of composite preparation, operating conditions for use in the hydrocarbon conversion processes, and the like particulars which are hereinafter given in the following detailed discussion of each of these facets of the present invention.

The bimetallic catalyst of the present invention comprises a porous carrier material or support having combined therewith a platinum group component, a bismuth component and a halogen component. Considering first the porous carrier material utilized in the present invention, it is preferred that the material be a porous, adsorptive, high surface area support having a surface area of about 25 to about 500 m.²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occurring, which may or may not be acid treated; for example, attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium, dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multi-valent cations; and, (6) combinations of one or more elements from one or more of these groups. The preferred porous carrier materials for use in the present invention are refractory inorganic oxides, with best results obtained with a carrier material consisting essentially of alumina. Suitable alumina materials are the crystalline aluminas known as the gamma-, eta-, and theta-alumina, with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g./cc. and surface area characteristics such that the average pore diameter is about 20 to 300 angstroms, the pore volume is about 0.1 to about 1 ml./g. and the surface area is about 100 to about 500 m.²/g. In general, best results are typically obtaintd with a gamma-alumina carrier material which is used in the form of spherical particles having: a relatively small diameter (i.e., typically about 1/16 inch), an apparent bulk density of about 0.5 g./cc., a pore volume of about 0.4 ml./g., and a surface area of about 175 m.²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the bimetallic composite of the present invention is a bismuth component. It is an essential feature of the present invention that substantially all of this component is present in the composite as the elemental metal. That is, it is believed to be a prerequisite for the acquisition of the beneficial effect of bismuth on a platinum-containing catalyst that the bismuth component exists in the catalytic composite in the zero oxidation state. All of the methods of preparation of the catalytic composite of the present invention include a substantially water-free prereduction step which is designed to result in the composite containing the bismuth component in the elemental metallic state.

The bismuth component may be incorporated into the catalytic composite in any suitable manner known to effectively disperse this component throughout the carrier material or to result in this condition. Thus, this incorporation may be accomplished by coprecipitation or cogellation with the porous carrier material, ion-exchange with the carrier material while it is in a gel state, or impregnation of the carrier material at any stage in its preparation. It is to be noted that it is intended to include within the scope of the present invention all conventional methods for incorporating a metallic component in a catalytic composite which results in a uniform distribution of the metallic component throughout the associated carrier material. One preferred method of incorporating the bismuth component into the catalytic composite involves coprecipitating the bismuth component during the preparation of the preferred refractory oxide carrier material. Typically, this involves the addition of a suitable, soluble, decomposable bismuth compound or complex to the alumina hydrosol, and then combining the hydrosol with a suitable gelling agent and dropping the resulting mixture into an oil bath as explained in detail hereinbefore. After drying and calcining the resulting gelled carrier material, there is obtained an intimate combination of alumina and bismuth oxide, which combination has the bismuth component uniformly dispersed throughout the alumina. Another preferred method of incorporating the bismuth component into the catalytic composite involves the utilization of a soluble, decomposable compound or complex of bismuth to impregnate the porous carrier material. In general, the solvent used in this preferred impregnation step is selected on the basis of its capability to dissolve the desired bismuth compound and is typically an aqueous acidic solution. Hence, the bismuth component may be added to the carrier material by commingling the latter with an aqueous solution of a suitable bismuth salt or water-soluble compound or complex of bismuth such as bismuth ammonium citrate, bismuth tribromide, bismuth trichloride, bismuth trihydroxide, bismuth oxybromide, bismuth oxychloride, bismuth trioxide, bismuth potassium tartrate, bismuth acetate, bismuth oxycarbonate, bismuth nitrate and the like compounds. Best results are ordinarily obtained with a solution of bismuth trichloride in hydrochloric acid. In general, the bismuth component can be impregnated either prior to, simultaneously with, or after the platinum group metallic component is added to the carrier material. However, I have obtained excellent results by impregnating the bismuth component simultaneously with the platinum group component. In fact, I have determined that a preferred impregnation solution contains chloroplatinic acid, hydrochloric acid, and bismuth trichloride.

Regardless of which bismuth compound is used in the preferred impregnation step, it is important that the bismuth component be uniformly distributed throughout the carrier material. In order to achieve this objective it is necessary to maintain the pH of the impregnation solution at a value less than 3, and preferably less than 1, and to dilute the solution to a volume which is approximately the same or greater than the volume of the carrier material which is impregnated. It is preferred to use a volume ratio of impregnation solution to carrier material of at least 0.75:1 and preferably about 1:1 to about 3:1 or more. Similarly, a relatively long contact time should be used during this impregnation step ranging from about 0.25 hour up to about 0.5 hour or more. The carrier material is likewise preferably constantly agitated during this impregnation step.

The bimetallic catalyst of the present invention also contains a platinum group component. Although the process of the present invention is specifically directed to the use of a catalytic composite containing platinum it is intended to include other platinum group metals such as palladium, rhodium, ruthenium, osmium, and iridium. It is essential that substantially all of the platinum group component such as platinum exist within the final catalytic composite as the elemental metal, and a prereduction step is hereinafter specified in order to accomplish this objective. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum metal. Good results are also obtained when the platinum group component is palladium metal.

The platinum group component may be incorporated in the catalytic composite in any suitable manner known to result in a uniform dispersion of this component in and through the carrier material such as coprecipitation or cogellation with the preferred carrier material, or ion-exchange or impregnation thereof. The preferred method of preparing the present catalyst involves the utilization of a water-soluble, decomposable compound of a platinum group metal to impregnate the carrier material in an acidic solution. Thus, the platinum group component may be added to the carrier by commingling the latter with an aqueous solution of a chloroplatinum group metal acid such as chloropalladic or chloroplatinic acid. Other water-soluble compounds or complexes of platinum group metals may be employed in impregnation solutions and include ammonium chloroplatinate, bromoplatinic acid, platinum dichloride, platinum tetrachloride hydrate, platinum dichlorocarbonyldichloride, dinitrodiaminoplatinum, palladium chloride, palladium nitrate, etc. The utilization of a platinum group metal chloride compound such as chloroplatinic acid is preferred since it facilitates the incorporation of both the platinum group metal component and at least a minor quantity of the essential halogen component in a single step. Hydrogen chloride, nitric acid or the like acid is also added to the impregnation solution in order to aid in the distribution or dispersion of this component throughout the carrier material. In addition, it is generally preferred to impregnate the carrier material after it has been calcined in order to minimize the risk of washing away the valuable platinum group metal compounds; however, in some cases it may be advantageous to impregnate the carrier material when it is in a gelled state.

Another essential constituent of the subject composite is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. as the chloride). This combined halogen may be either fluorine, chlorine, iodine, bromine, or mixtures thereof. Of these, chlorine or a compound of chlorine are preferred. The halogen may be added to the carrier material in any suitable manner either during preparation of the carrier material or before or after the addition of the components. For example, the halogen may be added at any stage of the preparation of the carrier material or to the calcined carrier material as an aqueous solution of a water-soluble, halogen-containing compound such as hydrogen fluoride, hydrogen chloride, hydrogen bromide, ammonium chloride, etc. The halogen component or a portion thereof may be combined with the carrier material during the impregnation of the latter with the platinum group or bismuth component; for example, through the utilization of a mixture of chloroplatinic acid, bismuth trichloride and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. percent and preferably about 0.5 to about 1.5 wt. percent halogen, calculated on an elemental basis. In isomerization or hydrocracking embodiments, it is generally preferred to utilize relatively larger amounts of halogen in the catalyst—typically ranging up to about 10 wt. percent halogen, calculated on an elemental basis, and, more preferably, about 1 to about 5 wt. percent. In a reforming embodiment, the preferred halogen component is chlorine or a compound thereof.

Regarding the amount of the bismuth component contained in the composite, I have found that it is essential to fix the amount of the bismuth component as a function of the amount of the platinum group component contained in the composite. More specifically, I have observed that the beneficial interaction of the bismuth component with the platinum group component is only obtained when the bismuth component is present, on an atomic basis, in an amount not greater than the platinum group component. Quantitatively, the amount of the bismuth component is preferably sufficient to provide an atomic ratio of lead to platinum group metal of about 0.1:1 to about 1:1, with best results obtained at an atomic ratio of about 0.1:1 to about 0.75:1. The criticalness associated with this atomic ratio limitation is apparent when an attempt is made to convert hydrocarbons with a catalyst having an atomic ratio of bismuth to platinum of greater than 1:1. In this latter case, substantial deactivation of the platinum component is observed. Accordingly, it is an essential feature of the present invention that the amount of the bismuth component is chosen as a function of the amount of the platinum group component in order to insure that the atomic ratio of these components in the resulting catalyst is within the stated range. Specific examples of especially preferred catalytic composites are as follows: (1) a catalytic composite comprising 0.375 wt. percent platinum, 0.25 wt. percent bismuth, and 0.5 to 1.5 wt. percent halogen combined with an alumina carrier material (atomic ratio Bi to Pt=0.94:1), (2) a catalytic comprising 0.375 wt. percent platinum, 0.15 wt. percent bismuth, and 0.5 to 1.5 wt. percent halogen combined with an alumina carrier material (atomic ratio Bi to Pt=0.38:1), (3) a catalytic composite comprising 0.375 wt. percent platinum, 0.1 wt. percent bismuth, and 0.5 to 1.5 wt. percent halogen combined with an alumina carrier material (atomic ratio Bi to Pt=0.25:1), (4) a catalytic composite comprising 0.375 wt. percent platinum, 0.05 wt. percent bismuth, and 0.5 to 1.5 wt. percent halogen combined with an alumina carrier material (atomic ratio Bi to Pt =0.126:1), and, (5) a catalytic composite comprising 0.75 wt. percent platinum, 0.4 wt. percent bismuth and 0.5 to 1.5 wt. percent halogen combined with an alumina carrier material (atomic ratio Bi to Pt=0.5:1).

Regardless of the details of how the components of the present catalyst are combined with the porous carrier material, the final catalyst generally will be dried at a temperature of about 200 to about 600° F. for a period of from about 2 to about 24 hours or more, and finally calcined or oxidized at a temperature of about 700° F. to about 1100° F. in an air atmosphere for a period of about 0.5 to about 10 hours in order to convert the metallic components substantially to the oxide form. Best results are generally obtained when the halogen content of the catalyst is adjusted during this oxidation step by including a halogen or a halogen-containing compound in the air atmosphere utilized. In particular, when the halogen component of the catalyst is chlorine, it is preferred to use a mole ratio of $H_2O$ to HCl of about 20:1 to about 100:1, and especially 50:1 to 70:1, during at least a portion of this oxidation step in order to adjust the final chlorine content of the catalyst to a range of about 0.5 to about 1.5 wt. percent.

It is an essential feature of the present invention that the resulting oxidized catalytic composite is subjected to a substantially water-free reduction step prior to its use in the conversion of hydrocarbons. This step is designed to reduce the metallic components to the elemental state and to insure that a uniform and finely divided dispersion of the metallic components throughout the carrier material is achieved. Preferably, a substantially pure and dry hydrogen stream (i.e., less than 20 vol. p.p.m. $H_2O$) is used as the reducing agent in this step. The substantially water-free reducing agent is contacted with the calcined catalyst at conditions, including a temperature of about 800° F. to about 1200° F., a gas hourly space velocity of about 100 to about 5000 $hr.^{-1}$, and a period of about 0.5 to 10 hours, selected to reduce both the platinum group component and the bismuth component to the metallic state. The preferred reduction temperature is about 1000 to about 1400° F. This reduction step may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding step designed to incorporate in the catalytic composite from about 0.05 to about 0.5 wt. percent sulfur, calculated on an elemental basis. Preferably, this presulfiding treatment takes place in the presence of hydrogen and a suitable sulfide-producing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a hydrocarbon charge stock and hydrogen are contacted with the bimetallic catalyst described herein in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, if is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case where the bimetallic catalyst of the present invention is used in a reforming operation, the reforming system will comprise a reforming zone containing a fixed bed of the bimetallic catalyst. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom, and to saturate any olefins that may be contained therein. That is, it is preferred that these charge stocks be essentially free of sulfur—less than 10 wt. p.p.m. sulfur.

In other hydrocarbon conversion embodiments, the charge stock will be of the conventional type customarily used for the particular kind of hydrocarbon conversion being effected. For example, in typical isomerization embodiments the charge stock can be a paraffinic stock rich in $C_4$ to $C_8$ normal paraffins, or a normal butane-rich stock, or an n-hexane-rich stock, or a mixture of alkylaromatics such as a mixture of xylenes, or an olefin-rich stock, etc. In hydrocracking embodiments the charge stock will be typically a straight-run gas oil, a vacuum gas oil, a heavy cracked cycle oil, etc. Likewise, pure hydrocarbons or substantially pure hydrocarbons can be converted to more valuable products by using the bimetallic catalyst of the present invention in any of the hydrocarbon conversion processes known to the art that use a dual-function, platinum group metal-containing catalyst.

In a reforming embodiment, it is generally preferred to utilize the present bimetallic catalytic composite in a substantially water-free environment. Essential to the achievement of this condition in the reforming zone is the control of the amount of water and water-producing substances present in the charge stock and the hydrogen stream which are passed to the zone. Best results are ordinarily obtained when the total amount of water or water-producing substances entering the conversion zone from any source is held to a level less than 50 p.p.m. and preferably less than 20 p.p.m., expressed as weight of equivalent water in the charge stock. In general, this can be accomplished by careful control of the amount of water and water-producing substances present in the charge stock and in the hydrogen stream; if necessary the charge stock can be treated by conventional means to remove substantially all water-producing substances and can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbants. Similarly, the water content of the charge stock may be adjusted by suitable stripping operations in a fractionation column or like device. And in some cases a combination of adsorbent drying and distillation drying may be used advantageously to effect almost complete removal of water from the charge stock. Preferably, the charge stock is dried to a level corresponding to less than 20 p.p.m. of $H_2O$ equivalent. In the case where the hydrogen stream contains too much water, it is preferred to dry the hydrogen stream down to a level corresponding to about 10 vol. p.p.m. of water or less. This can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25 to 100° F. wherein a hydrogen-rich gas is separated from a high octane liquid product, commonly designated as a reformate. A major portion of this hydrogen-rich gas is then usually returned to the reforming zone through suitable compressing means. If the water level into the reforming zone is too high, at least a portion of this hydrogen-rich recycle gas stream is passed through an adsorption zone containing an adsorbent selective for water. The resultant substantially water-free hydrogen stream is then recycled through suitable compressing means back to the reforming zone. The liquid phase from the separating zone is then typically withdrawn and commonly treated in a fractionating system in order to adjust its butane concentration and thereby control front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° F. to about 1000° F. and preferably about 75 to about 600° F.; a pressure of atmospheric to about 100 atmospheres; hydrogen to hydrocarbon mole ratio of about 0.5 to about 20:1 and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; an LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention, the pressure utilized is preferably selected in the range of about 0 p.s.i.g. to about 1000 p.s.i.g., with best results obtained at about 50 to about 350 p.s.i.g. In fact, it is a singular advantage of the present invention that it allows stable operation at lower pressure than have heretofore been successfully utilized in so-called "continuous" reforming systems (i.e., reforming for periods of about 15 to about 200 or more barrels of charge per pound of catalyst without regeneration) with a monometallic, platinum-containing catalyst. In other words, the bimetallic catalyst of the present invention allows the operation of a continuous reforming system to be conducted at lower pressure (i.e., 50 to 350 p.s.i.g.) for about the same or better catalyst life before regeneration as has been heretofore realized with conventional all-platinum catalysts at higher pressures (i.e., 400 to 600 p.s.i.g.).

Similarly, the temperature required for a reforming process with the present bimetallic catalyst is generally lower than that required for similar reforming operation using a high quality monometallic, platinum catalyst of the prior art. This significant and desirable feature of the present invention is a consequence of the selectivity of the bimetallic catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the bimetallic catalyst of the present invention than for a high quality reforming catalyst which is manufactured in exactly the same manner as the catalyst of the present invention except for the inclusion of the bismuth component. Moreover, for the bimetallic catalyst of the present invention, the $C_5^+$ yield loss for a given temperature increase is substantially lower than for a high quality all-platinum reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone, with excellent results obtained when about 5 to about 10 moles of hydrogen are used per mole of hydrocarbon. Likewise, the liquid hourly space velocity (LSHV) used in reforming is seletced from the range of about 0.1 to about 10 hr.$^{-1}$, with a value in the range about 1 to about 5 hr.$^{-1}$ being preferred.

The following examples are given to illustrate further the preparation of the catalytic composite of the present invention and the use thereof in the conversion of hydrocarbons. It is understood that the examples are given for the sole purpose of illustration.

EXAMPLE I

This example demonstrates a preferred method of preparing the bimetallic catalytic composite of the present invention.

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Pat. No. 2,620,314.

The resulting gamma-alumina particles were then contacted with an impregnation solution containing chloroplatinic acid and bismuth trichloride in an amount sufficient to result in a final composite containing 0.375 wt. percent platinum and 0.25 wt. percent bismuth, calculated on an elemental basis. In addition, the impregnation solution contained hydrochloric acid in an amount equivalent to about 3 wt. percent of the alumina particles. In order to insure uniform distribution of both metallic components throughout the carrier material, this impregnation step was performed by adding the carrier material particles to the impregnation mixture with constant agitation. In addition, the volume of the impregnation solution was equal to the volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination or oxidation treatment in an air atmosphere at a temperature of about 975° F. for about 1 hour. The oxidized spheres were then contacted with an air stream containing $H_2O$ and HCl in a mole ratio of about 50:1 to about 70:1 for about 2 hours at 975° F. in order to adjust the halogen content of the catalyst particles to a value of about 0.9 to about 1.1.

The resulting catalyst particles were analyzed and found to contain, on an elemental basis, about 0.375 wt. percent platinum, about 0.25 wt. percent bismuth, and about 1.03 wt. percent chloride. On an atomic basis, the ratio of bismuth to platinum was 0.625:1.

Thereafter, the resulting oxidized catalyst particles were subjected to a dry pre-reduction treatment by contacting them on a once-through basis, with a substantially pure hydrogen stream containing less than 20 vol. p.p.m. $H_2O$ at a temperature of about 1050° F., a pressure slightly above atmospheric and a flow rate of the hydrogen stream through the catalyst particles corresponding to a gas hourly space velocity of about 720 hr.$^{-1}$. This pre-reduction step was for a duration of about 1 hour. The resulting catalyst is designated catalyst "A."

EXAMPLE II

Example I was repeated except that the amount of bismuth trichloride in the impregnation solution was adjusted to result in a catalyst containing 0.15 wt. percent bismuth, which corresponds to an atomic ratio of bismuth to platinum of 0.376:1. The resulting catalyst is designated catalyst "B."

EXAMPLE III

Example I was repeated except that the amount of bismuth trichloride added to the impregnation solution was adjusted to result in a catalyst containing 0.05 wt. percent bismuth, which corresponds to an atomic ratio of bismuth to platinum of 0.126:1. The resulting catalyst is designated catalyst "C."

EXAMPLE IV

In order to compare the bimetallic catalytic composite of the present invention with those of the prior art in a manner calculated to bring out the interaction between the bismuth component and the platinum component, a comparison test was made between the catalysts of the present invention, catalysts "A," "B," and "C" and a reforming catalyst of the prior art, catalyst "D," which contained platinum as its sole hydrogenation-dehydrogenation component. That is to say, the control catalyst was a combination of platinum and chlorine with a gamma-alumina carrier material which was prepared by a manner analogous to that given in Example I except for the inclusion of the bismuth component and contained, on an elemental basis, about 0.75 wt. percent platinum and about 0.85 wt. percent chloride.

These catalysts were then separately subjected to a high stress evaluation test designed to determine their relative activity and selectivity for the reforming of a gasoline charge stock. In all tests the same charge stock was utilized, its characteristics are given in Table I. It is to be noted that this test is conducted under a substantially water-free condition with the only significant source of water being the 5 wt. p.p.m. present in the charge stock.

TABLE I.—ANALYSIS OF HEAVY KUWAIT NAPHTHA

| | |
|---|---|
| API gravity at 60° F. | 60.3 |
| Initial boiling point, ° F. | 170 |
| 10% boiling point, ° F. | 195 |
| 50% boiling point, ° F. | 238 |
| 90% boiling point, ° F. | 316 |
| End boiling point, ° F. | 375 |
| Sulfur, wt. p.p.m. | 0.1 |
| Nitrogen, wt. p.p.m. | 0.1 |
| Aromatics, vol. percent | 10 |
| Paraffins, vol. percent | 70 |
| Naphthenes, vol. percent | 20 |
| Water, p.p.m. | 5 |
| Octane number, F-1 clear | 40.0 |

This test was specifically designed to determine in a very short time period whether the catalyst being evaluated has superior characteristics for the reforming process. It consists of 8 periods comprising a 6 hour line-out period followed by three 10-hour test periods run at a constant temperature of about 970° F. followed by another 6-hour line-out period and three 10-hour test periods run at a constant temperature of about 1000° F. During each test period a C$_5$+ product reformate is collected. This test was performed in a laboratory scale reforming plant comprising a reactor containing the catalyst to be tested, a hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst to be tested as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction. The portion of gas from the separating zone that is not needed to maintain plant pressure is separately recovered as an excess separator gas product stream. Moreover, the liquid phase formed in the separating zone is withdrawn therefrom and passed to the debutanizer column wherein light ends are taken overhead as debutanizer and a C$_5$+ reformate stream recovered as bottoms.

Conditions utilized in this test are: a constant temperature of about 970° F. for the first three test periods followed by a constant temperature of about 1000° F. for the last three periods, a liquid hourly space velocity of 3.0 hr.$^{-1}$, a pressure at the outlet of the reactor of 100 p.s.i.g., and a mole ratio of hydrogen to hydrocarbon entering the reactor of about 5.6:1. This two-temperature test is designed to quickly and efficiently yield two points on the yield-octane curve for the particular catalysts being tested. The conditions utilized are selected on the basis of experience to yield the maximum amount of information on the capability of the catalyst being tested to respond to a high severity operation.

Th results of the separate tests performed on the bimetallic catalysts of the present invention, catalysts "A," "B" and "C" and the control catalyst, catalyst "D" are are presented for each test period in Table II in terms of inlet temperature to the reactor in ° F., excess separator gas in standard cubic feet per barrel of charge (s.c.f./bbl.), debutanizer overhead gas in s.c.f./bbl., the ratio of the debutanizer gas make to the total gas make, and F-1 clear octane number of product reformate.

TABLE II.—RESULTS OF ACCELERATED REFORMING TESTS

| Period number | T, ° F. | Excess separator gas, s.c.f./bbl. | Debutanizer gas, s.c.f./bbl. | Debut. gas/ total gas ratio | Octane No., F-1 clear |
|---|---|---|---|---|---|
| Catalyst "A"—0.375 wt. percent Pt plus 0.25 wt. percent Bi plus 1.03 wt. percent Cl | | | | | |
| 1 | 972 | 1,530 | 54 | .034:1 | 97.5 |
| 2 | 973 | 1,411 | 58 | .040:1 | 96.3 |
| 3 | 970 | 1,331 | 60 | .043:1 | 94.6 |
| 4 | 1,000 | 1,390 | 80 | .054:1 | 96.9 |
| 5 | 1,000 | 1,276 | 87 | .064:1 | 94.7 |
| 6 | 1,001 | 1,181 | 94 | .074:1 | 92.5 |
| Catalyst "B"—0.375 wt. percent Pt plus 0.15 wt. percent Bi plus 1.07 wt. percent Cl | | | | | |
| 1 | 968 | 1,426 | 50 | .034:1 | 96.2 |
| 2 | 970 | 1,358 | 55 | .039:1 | 94.8 |
| 3 | 970 | 1,307 | 51 | .038:1 | 94.8 |
| 4 | 1,000 | 1,465 | 64 | .042:1 | 97.2 |
| 5 | 1,000 | 1,428 | 71 | .047:19 | 96.0 |
| 6 | 1,000 | 1,347 | 76 | .054:1 | 94.7 |
| Catalyst "C"—0.375 wt. percent Pt plus 0.05 wt. percent Bi plus 1.04 wt. percent Cl | | | | | |
| 1 | 972 | 1,463 | 68 | .045:1 | 96.7 |
| 2 | 969 | 1,356 | 76 | .053:1 | 95.4 |
| 3 | 970 | 1,291 | 71 | .052:1 | 93.9 |
| 4 | 1,000 | 1,404 | 83 | .056:1 | 96.2 |
| 5 | 1,001 | 1,287 | 87 | .064:1 | 94.6 |
| 6 | 1,000 | 1,219 | 92 | .070:1 | 92.5 |
| Catalyst "D"—0.75 wt. percent Pt plus 0.9 wt. percent Cl | | | | | |
| 1 | 970 | 1,240 | 56 | .044:1 | 93.0 |
| 2 | 969 | 1,159 | 64 | .056:1 | 91.3 |
| 3 | 971 | 1,111 | 68 | .058:1 | 90.3 |
| 4 | 1,000 | 1,117 | 86 | .071:1 | 91.8 |
| 5 | 1,000 | 992 | 90 | .083:1 | 89.2 |
| 6 | 1,000 | 888 | 93 | .094:1 | 85.9 |

Referring now to the results of the separate tests presented in Table II, it is evident that the effect of the bismuth component on the platinum-containing catalyst is to substantially promote the platinum metal component and to enable catalysts containing less platinum to significantly out-perform a catalyst containing a substantially greater amount of platinum. That is, the bimetallic catalysts of the present invention are sharply superior to the control catalyst in both activity and selectivity. As was pointed out hereinbefore, a good measure of activity for a reforming catalyst is octane number of reformate produced at the same conditions; on this basis, all of the catalysts of the present invention were more active than the control catalyst at both temperature conditions. However, activity is only half of the story: activity must be coupled with selectivity to demonstrate superiority. Selectivity is measured directly by reference to C$_5$+ yield and indirectly, (1) by reference to excess separator gas make, which is roughly proportional to net hydrogen make, which in turn, is a product of the preferred octane-upgrading reactions; and (2) by reference to debutanizer gas make which is a rough measure of undesired hydrocracking and should be minimized for a highly selective catalyst. These two factors are combined in the numbers presented for ratio of debutanizer gas to total gas make; this parameter provides a sensitive indication of selectivity with the more selective catalyst always showing the smaller gas ratio. Referring again to the data presented in Table II and using these selectivity criteria, it is manifest that the bimetallic catalysts of the present invention are materially more selective than the control catalyst at both temperature conditions.

From the consideration of this data, it is clear that bismuth is an efficient and effective promoter of a platinum metal-containing reforming catalyst.

It is intended to cover by the following claims all changes and modifications of the present invention that would be self-evident to a man of ordinary skill in the catalyst formulation art or the hydrocarbon conversion art.

I claim as my invention:

1. A process for reforming a hydrocarbon stream containing paraffins and naphthenes which comprises contacting said hydrocarbon stream at reforming conditions with a catalytic composite comprising a combination of a platinum or palladium component, a bismuth component and a halogen component with a porous carrier material consisting essentially of alumina, wherein the platinum or palladium component and halogen component are present in amounts sufficient to result in the composite containing, on an elemental basis, about 0.01 to about 2 wt. percent platinum or palladium and about 0.1 to about 3.5 wt. percent halogen, wherein the bismuth component is present in an amount corresponding to an atomic ratio of bismuth to platinum group metal in the range of about 0.1:1 to about 1:1, wherein both the bismuth and platinum or palladium components are uniformly dispersed throughout said alumina, and wherein substantially all of the platinum or palladium component and the bismuth component are present as the elemental metals.

2. A process as defined in claim 1 wherein said hydrocarbon is a gasoline fraction which is contacted in admixture with hydrogen with said catalytic composite at said reforming conditions.

3. A process as defined as in claim 1 wherein the halogen component is a chlorine or a compound of chlorine.

4. A process as defined in claim 1 wherein the bismuth component is present in an amount corresponding to an atomic ratio of bismuth to platinum group metal in the range of about 0.1:1 to about 0.75:1.

5. A process as defined in claim 2 wherein the reforming conditions utilized include a temperature of about 800 to about 1100° F., a pressure of about 0 to about 1000 p.s.i.g., a liquid hourly space velocity of about 0.1 to about 10 hr.$^{-1}$ and a hydrogen to hydrocarbon ratio of about 1:1 to about 20:1.

6. A process as defined in claim 5 wherein the pressure is about 50 to about 350 p.s.i.g.

7. A process as defined in claim 2 wherein the contacting is performed in a substantially water-free environment.

8. A process as defined in claim 2 wherein the gasoline fraction is essentially sulfur-free.

References Cited
UNITED STATES PATENTS

| | | | |
|---|---|---|---|
| 3,651,163 | 3/1972 | Radford et al. | 208—139 |
| 3,156,737 | 11/1964 | Gutberlet | 260—683.65 |
| 3,206,391 | 9/1965 | Gutberlet et al. | 208—108 |
| 3,511,888 | 5/1970 | Jenkins | 208—138 |
| 3,291,755 | 12/1966 | Haensel et al. | 260—683.3 |
| 3,442,796 | 5/1969 | Hayes | 208—139 |
| 2,245,735 | 6/1941 | Subkow | 260—683.58 |
| 3,651,162 | 3/1972 | Pohlmann et al. | 260—672 T |

DELBERT E. GANTZ, Primary Examiner

J. W. HELLWEGE, Assistant Examiner

U.S. Cl. X.R.

252—441, 442